United States Patent
Close et al.

(10) Patent No.: US 7,041,217 B1
(45) Date of Patent: May 9, 2006

(54) FILTER RINGS

(75) Inventors: Jeffery A Close, Genoa City, WI (US); Eugene W Altwies, Burlington, WI (US); James R Berna, McHenry, IL (US)

(73) Assignee: Filtertek Inc., Hebron, IL (US)

( * ) Notice: Subject to any disclaimer, the term of this patent is extended or adjusted under 35 U.S.C. 154(b) by 0 days.

(21) Appl. No.: 11/017,018

(22) Filed: Dec. 20, 2004

(51) Int. Cl.
*B01D 29/11* (2006.01)
*B01D 35/02* (2006.01)
*B01D 35/28* (2006.01)

(52) U.S. Cl. .............. 210/232; 210/495; 210/497.01; 210/499; 210/767

(58) Field of Classification Search ........... 210/232, 210/495, 497.01, 499, 767
See application file for complete search history.

(56) References Cited

U.S. PATENT DOCUMENTS

| | | | |
|---|---|---|---|
| 3,633,757 A | 1/1972 | Madern | |
| 4,014,796 A | 3/1977 | Sugiyama et al. | |
| 4,207,189 A | 6/1980 | Geuenich | |
| 4,690,757 A | 9/1987 | Mathus et al. | |
| 4,836,923 A | 6/1989 | Popoff et al. | |
| 5,169,524 A | 12/1992 | Meiritz et al. | |
| 5,200,067 A | 4/1993 | Sann | |
| 5,209,845 A | 5/1993 | Sims | |
| 5,308,485 A | 5/1994 | Griffin et al. | |
| 5,482,621 A * | 1/1996 | Nurse ................... | 210/170 |
| 5,807,483 A | 9/1998 | Cassidy et al. | |
| 5,820,754 A | 10/1998 | Cassidy et al. | |

FOREIGN PATENT DOCUMENTS

JP     2002-285966     * 10/2002

* cited by examiner

*Primary Examiner*—Thomas M. Lithgow
(74) *Attorney, Agent, or Firm*—Harness, Dickey & Pierce, P.L.C.

(57) ABSTRACT

A filter ring includes a first filter member including a first end portion and a second filter member including a second end portion. The filter ring also includes at least one snap latch mechanism for detachably engaging the first end portion with the second end portion such that the first and second filter members cooperate to define a generally annular shape having a central opening. The first end portion includes at least one key configured to be positioned within at least one keyway defined by the second end portion for inhibiting disengagement of the snap latch mechanism when the snap latch mechanism is detachably engaging the first end portion with the second end portion.

38 Claims, 8 Drawing Sheets

FILTER RINGS

FIELD

The invention generally relates to filter rings having snap latch mechanisms and features for inhibiting the disengagement of such snap latch mechanisms.

BACKGROUND

Various types of filter rings can be used to filter fluid flowing through a circumferential opening in a fluid conducting body. For example, a filter ring can be positioned around a fuel inlet port of a fuel injector to filter foreign particles from the fuel before the fuel passes through the inlet port into the fuel injector. In this exemplary manner, the filter ring helps prevent unwanted particles from entering the fuel injection system.

SUMMARY

According to one aspect of the present invention, a filter ring includes a first filter member including a first end portion and a second filter member including a second end portion. The filter ring also includes at least one snap latch mechanism for detachably engaging the first end portion with the second end portion such that the first and second filter members cooperate to define a generally annular shape having a central opening. The first end portion includes at least one key configured to be positioned within at least one keyway defined by the second end portion for inhibiting disengagement of the snap latch mechanism when the snap latch mechanism is detachably engaging the first end portion with the second end portion.

Further aspects and features of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The invention will become more fully understood from the detailed description and the accompanying drawings, wherein.

Corresponding reference numerals indicate corresponding features throughout the several views of the drawings.

DETAILED DESCRIPTION OF THE EXEMPLARY EMBODIMENTS

The following description of the exemplary embodiments is merely exemplary in nature and is in no way intended to limit the invention, its applications, or uses.

FIGS. 1 through 8 illustrate an exemplary filter ring 100 in accordance with the principles of this invention. As shown, the filter ring 100 includes a first filter member 104 and a second filter member 108. The filter ring 100 also includes a hinge 112 hingedly coupling the respective end portions 116 and 120 of the filter members 104 and 108. The filter ring 100 further includes an interlock or snap latch mechanism 124 for releasably engaging the respective end portions 128 and 132 of the filter members 104 and 108.

The terms "first" and "second" are used in the following description for the purpose of reference only, and thus are not intended to be limiting. For example, the terms "first filter member" and "second filter member" are used even for those embodiments in which the filter ring is monolothically formed as a single component. In addition, the terms "first" and "second" and other such numerical terms referring to structures do not imply a sequence or order unless clearly indicated by the context.

Figure 1:
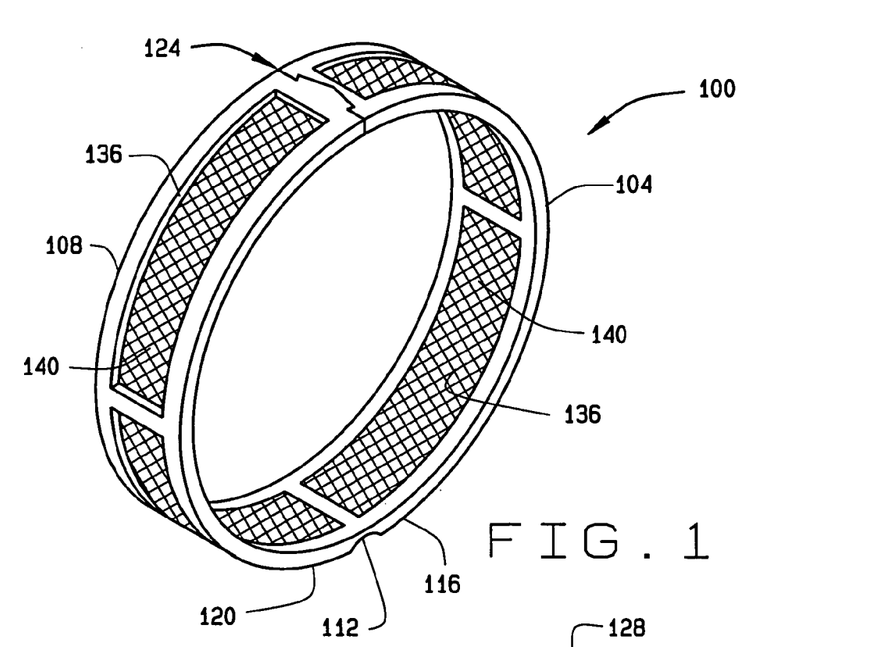
FIG. 1 is a perspective view of a filter ring including a snap latch mechanism according to one exemplary embodiment of the invention and illustrating the snap latch mechanism detachably engaging the filter ring's end portions.
Figure 3:
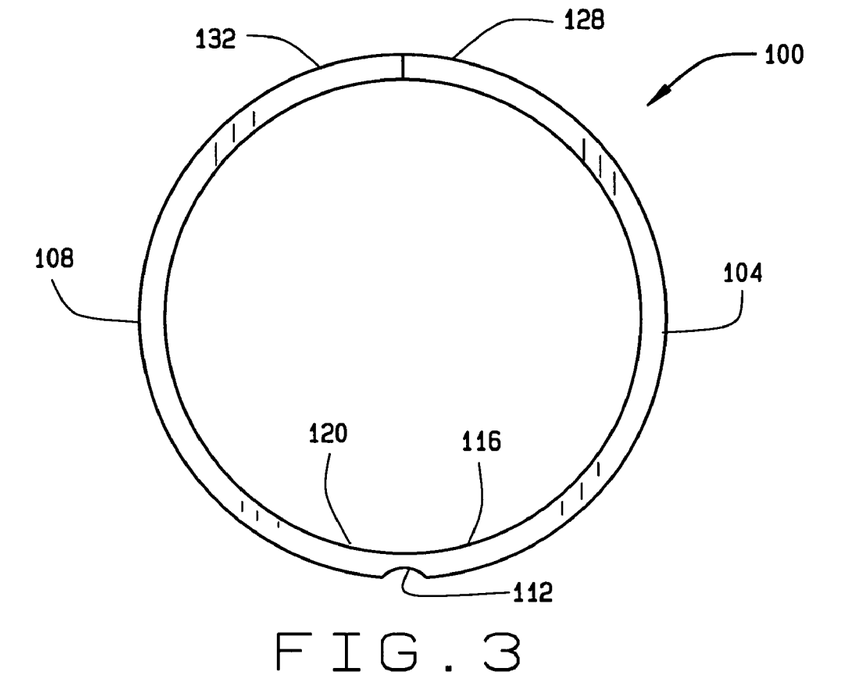
FIG. 3 is a front elevation view of the filter ring shown in FIG. 1.

Each filter member 104 and 108 comprises a semi-circular frame. When the snap latch mechanism 124 is detachably engaging the end portions 128 and 132, the filter members 104 and 108 cooperate to define a generally circular frame as shown in FIGS. 1 and 3. In alternative embodiments, however, the filter members can cooperate to define other suitable shapes, such as rectangular, ovular, etc. Accordingly, embodiments of the invention should not be limited to only circular filter rings. Further, the size and shape of the filter ring can vary depending, for example, on the particular fluid conducting body (e.g., fuel injector, valve body, cartridge body of a turbocharger, etc.) on which the filter ring 100 will be installed.

For example, in some embodiments, the filter ring 100 is configured for use with a cartridge body of a turbocharger in which the filter ring 100 filters unwanted foreign particular matter from engine oil before the engine oil flows through an inlet into the cartridge body of the turbocharger. In other embodiments, the filter ring 100 is configured for use with a fuel injector in which the filter ring 100 filters unwanted foreign particular matter from fuel before the fuel flows through an inlet port into the fuel injector. In many fuel injectors, the fuel inlet port is located within an annular recess defined by the body of the fuel injector. In such embodiments, the filter ring 100 can be sized and shaped to be closely seated within that annular recess and thus filter the fuel flowing through the fuel inlet port into the fuel injector.

Figure 2:
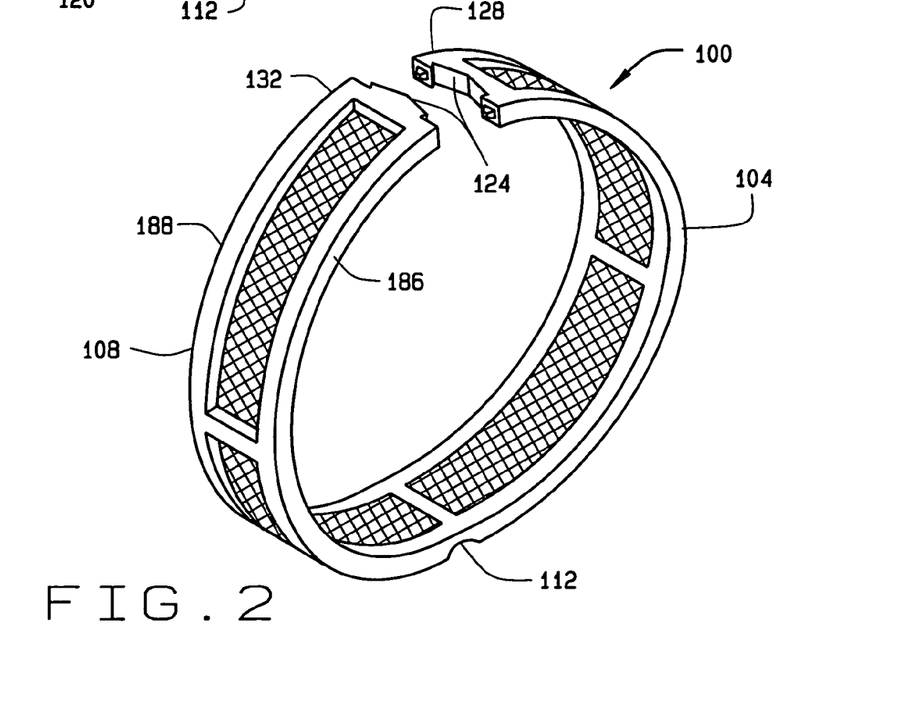
FIG. 2 is a perspective view of the filter ring shown in FIG. 1 but illustrating the snap latch mechanism disengaged.

In the illustrated embodiment of FIGS. 1 and 2, the filter ring 100 includes four rectangular apertures 136 into which four rectangular filter screens 140 are respectively positioned. In one embodiment, the filter screens 140 are formed from stainless steel mesh having a pore size of about one hundred ninety microns. Alternatively, the number, size, and shape of the apertures 136 and filter screens 140 can vary depending, for example, on the particular application in which the filter ring 100 will be used. In addition, other pore sizes, other filtration materials, and other types of filtering means can be employed as aspects of the invention are not limited to any particular type of filtering means, pore size, or filtration material.

Figure 4:
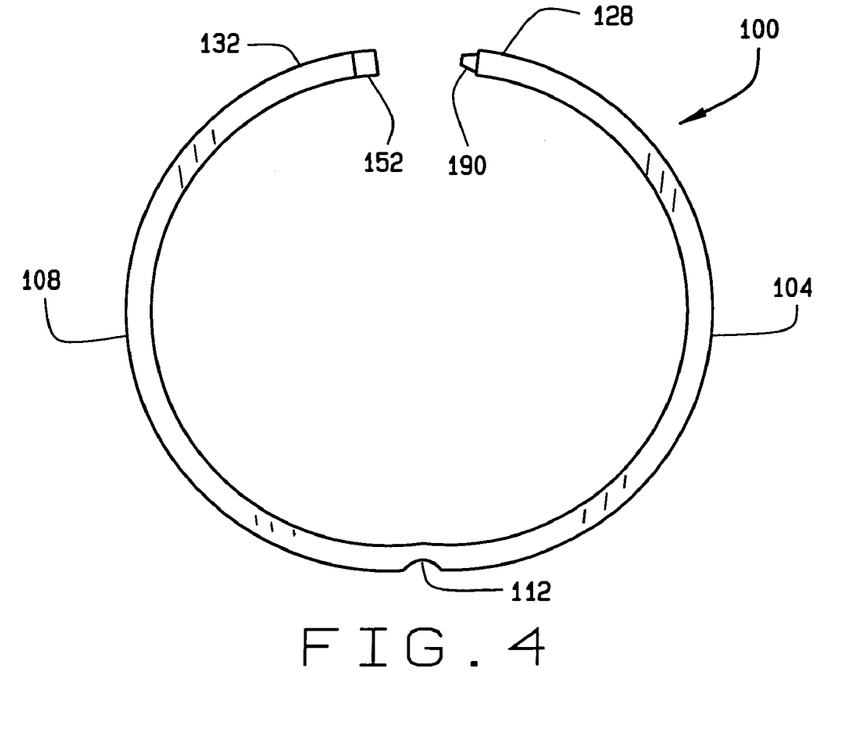
FIG. 4 is a front elevation view of the filter ring shown in FIG. 2.

In some embodiments, the filter members 104 and 108 are hingedly connected to one another. As shown in FIGS. 3 and 4, the end portions 116 and 120 of the respective filter members 104 and 108 are hingedly coupled to one another by the hinge 112. The hinge 112 is integrally formed from the same material as the filter members 104 and 108. But the material forming the hinge 112 is made thinner by way of an axially-extending cutout or groove, which enhances the ability of the hinge 112 to bend and flex.

Alternatively, other embodiments can include other means for hingedly coupling the filter members to one another. For example, another embodiment includes a mechanical-type hinge that is separately engaged to (and not integrally formed with) the filter ring. Yet other embodiments include first and second filter members that are not hingedly coupled to one another.

With reference now to FIGS. 5 through 8, the snap latch mechanism 124 includes first and second interlocking members 148 and 152. The interlocking members 148 and 152 are configured to be detachably engaged with one another. When the interlocking members 148 and 152 are engaged with one another, the filter members 104 and 108 cooperate to define a generally annular shape having a central opening (FIG. 3).

Figure 5:
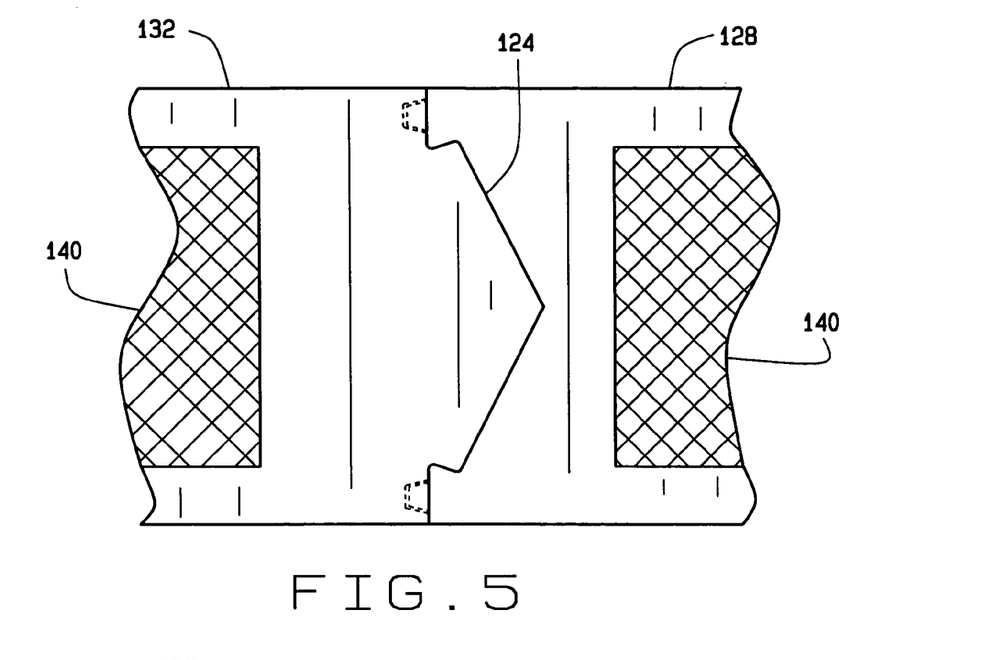
FIG. 5 is a partial view of the filter ring shown in FIG. 1 and illustrating two keys positioned within corresponding keyways for inhibiting disengagement of the snap latch mechanism.
Figure 6:
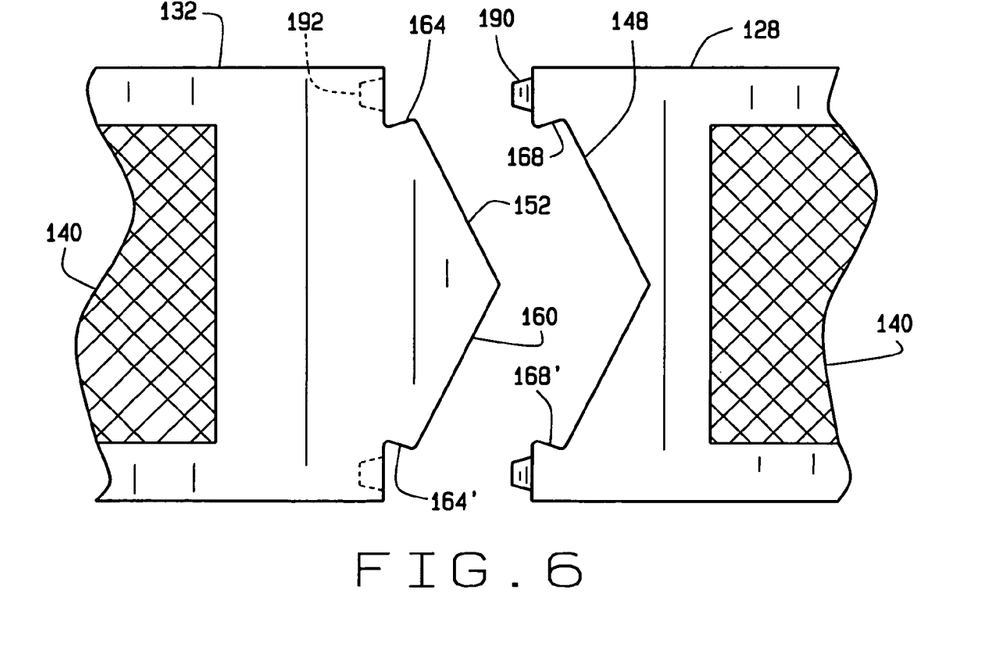
FIG. 6 is a partial view of the filter ring shown in FIG. 5 but illustrating the snap latch mechanism disengaged and the keys aligned for engagement with corresponding keyways.

As best seen in FIGS. 5 and 6, the second interlocking member 152 includes a protrusion 160 having tapered side surfaces 164 and 164'. The protrusion 160 and its tapered side surfaces 164 and 164' define a generally arrowhead shape extending outwardly from the second end portion 132.

The first interlocking member 148 comprises a cutout or void extending generally inwardly into the first end portion 128. The cutout is complementary in shape to the second interlocking member 152. When the second interlocking member 152 is inserted into and engaged with the first interlocking member 148, portions 168 and 168' of the first interlocking member 148 respectively engage the tapered portions 164 and 164' of the second interlocking member 152.

In some embodiments, the material forming the first end portion 128 is sufficiently resilient such that the portions 168 and 168' operate as resilient tines that frictional grip or snap around the second interlocking member 152. In this exemplary manner, the engagement of the interlocking members 148 and 152 forms a substantially fluid tight seal therebetween that helps prevent unfiltered fluid from flowing between the interlocking members 148 and 152 and circumventing the filter screens 140. The gripping force applied by the portions 168 and 168' to the second interlocking member 152 can depend on, for example, the particular configuration (e.g., shape, axial length, radial thickness, material, etc.) of the interlocking members 148 and 152.

Figure 7:
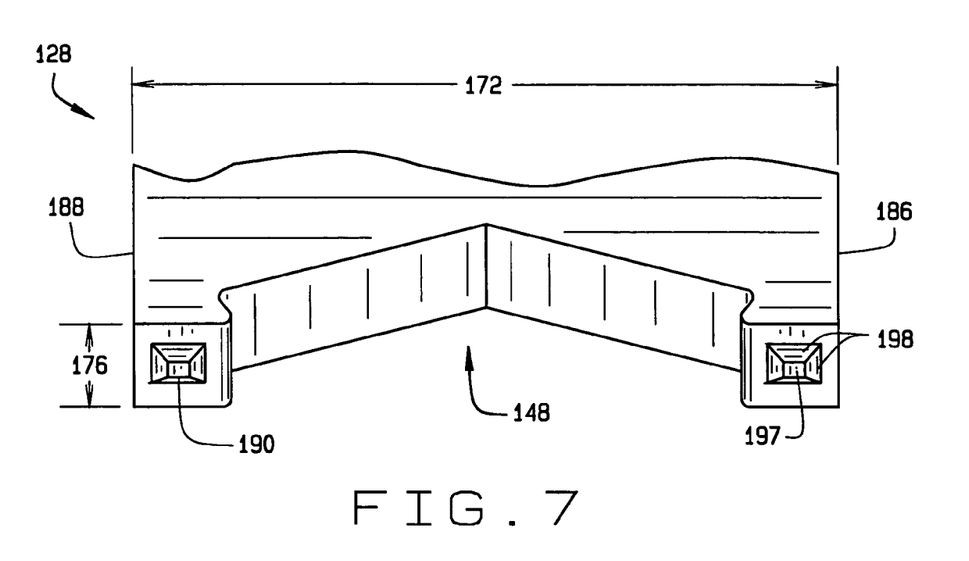
FIG. 7 is a perspective view of one of the end portions of the filter ring shown in FIG. 1.
Figure 8:
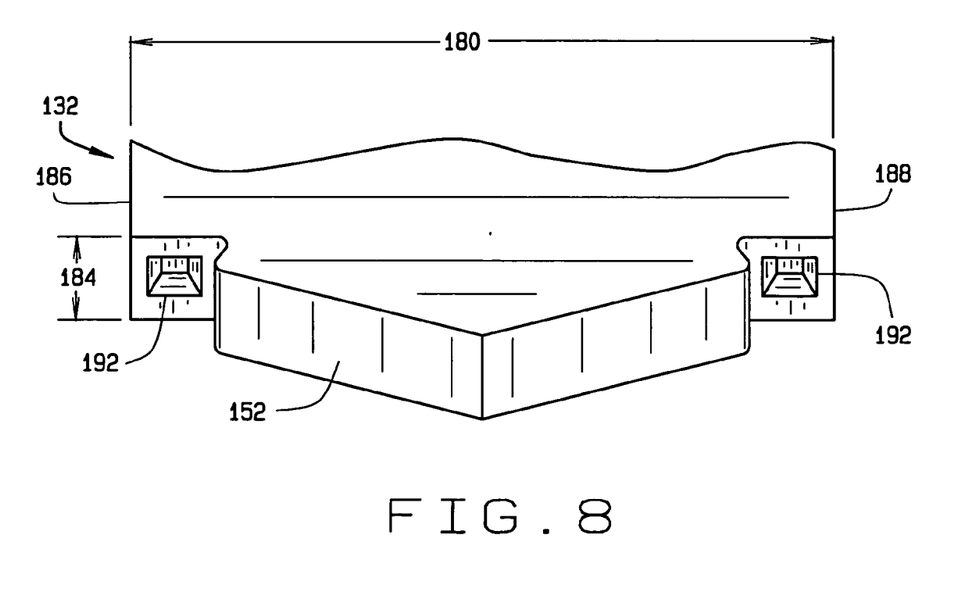
FIG. 8 is a perspective view of the other end portion of the filter ring shown in FIG. 1.

As shown in FIGS. 7 and 8, the first interlocking member 148 has an axial length less than the axial length 172 of the first end portion 128. The first interlocking member 148 has a radial thickness about equal to the radial thickness 176 of the first end portion 128. The second interlocking member 152 has an axial length less than the axial length 180 of the second end portion 132. The second interlocking member 152 has a radial thickness about equal to the radial thickness 184 of the second end portion 132.

With the axial length of each interlocking member 148 and 152 being less than the axial length of the corresponding end portion 128 and 132, the interlocking members 148 and 152 do not extend beyond the circumferential edge portions 186 and 188 of the filter ring 100. In addition, with the radial thickness of each interlocking member 148 and 152 being about equal to the radial thickness of the corresponding end portion 128 and 132, the interlocking members 148 and 152 are within the circular contour of the inner and outer diameters of the filter ring 100 (as shown in FIG. 3). Accordingly, the interlocking members 148 and 152 should thus not interfere with the proper seating of the filter ring 100 within, for example, an annular recess defined by a fluid conducting body.

Figure 9:
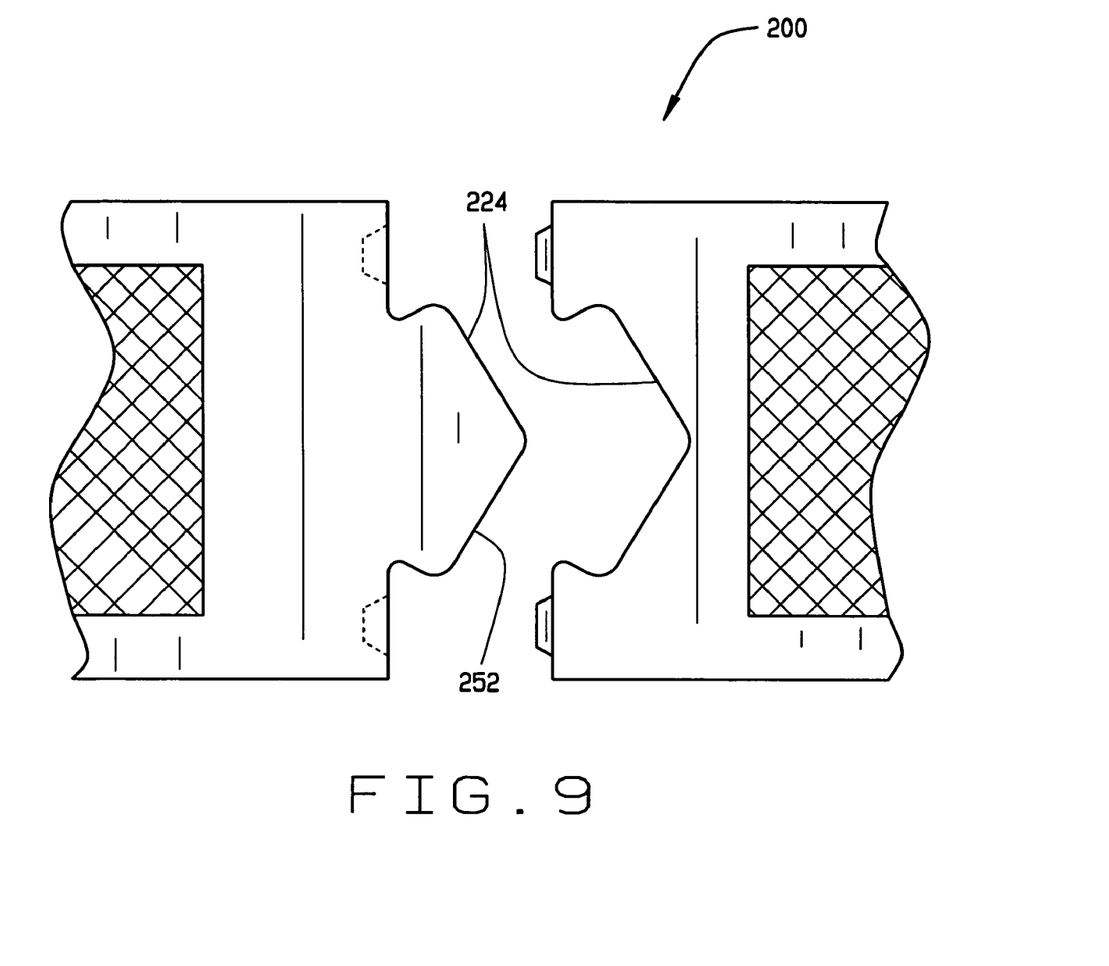
FIG. 9 is a partial view of a filter ring including two keys and corresponding keyways for inhibiting disengagement of a snap latch mechanism when the snap latch mechanism is detachably engaging the filter ring's end portions according to one exemplary embodiment of the invention.

Alternatively, other configurations (e.g., shapes and sizes) are possible for the interlocking members 148 and 152, and aspects of the invention are not limited to the particular configuration of the snap latch mechanism 124 shown in FIGS. 1 through 8. Alternative embodiments can include other means for detachably engaging the respective end portions of the first and second filter members. For example, FIG. 9 illustrates a filter ring 200 having a snap latch mechanism 224 in which the interlocking member 252 includes a protrusion having a more rounded arrowhead shape than the protrusion 160 of snap latch mechanism 124.

With further reference to FIGS. 5 through 8, the first end portion 128 includes keys or pins 190. The keys 190 are each sized to be positioned within a corresponding keyway or recess 192 defined by the second end portion 132. The keys 190 and keyways 192 are configured such that positioning the keys 190 within the keyways 192 inhibits the radial disengagement of the interlocking members 148 and 152 when the snap latch mechanism 124 is detachably engaging the first end portion 128 with the second end portion 132. In this manner, the engagement of the keys 190 with the keyways 192 increases the radial force required to radially disengage the interlocking members 148 and 152. This increase in the required radial force can help keep the filter ring 100 closed during shipping and/or after installation in a bidirectional flow environment when the fluid is flowing radially outward through the filter screens 140.

It has been observed that in one particular embodiment including the keys 190 and keyways 192, the radial force required to disengage the snap latch mechanism 124 ranged from 1.235 pounds to 2.577 pounds with an average of 1.724 pounds and 0.276 standard deviation. In comparison the average radial force required to disengage a snap latch mechanism for a filter ring that did not include any such keys and keyways was 0.850 pounds with a 0.298 standard deviation. Accordingly, the engagement of the keys 190 with the keyways 192 more than doubled the average radial force needed to radially disengage the snap latch mechanism 124. But this test data is for purposes of illustration only, and the increase (if any) in the required radial force will depend on the particular configuration (e.g., number of, shape, size, arrangement, etc.) of the keys and keyways.

In addition, the keys 190 and keyways 192 can be configured such that when engaged they also inhibit the relative radial movement of the filter ring's first and second end portions 128 and 132. Alternative embodiments, however, can include other means for inhibiting disengagement of a snap latch mechanism when the snap latch mechanism is detachably engaging the end portions of a filter ring.

With further reference to FIGS. 5 through 8, the keys 190 are each disposed between the first interlocking member 148 and a respective one of the circumferential edge portions 186 and 188. The keyways 192 are each disposed between the second interlocking member 152 and a respective one of the circumferential edge portions 186 and 188. Accordingly, the first interlocking member 148 is between the keys 190, and the second interlocking member 152 is between the keyways 192.

Figure 12:
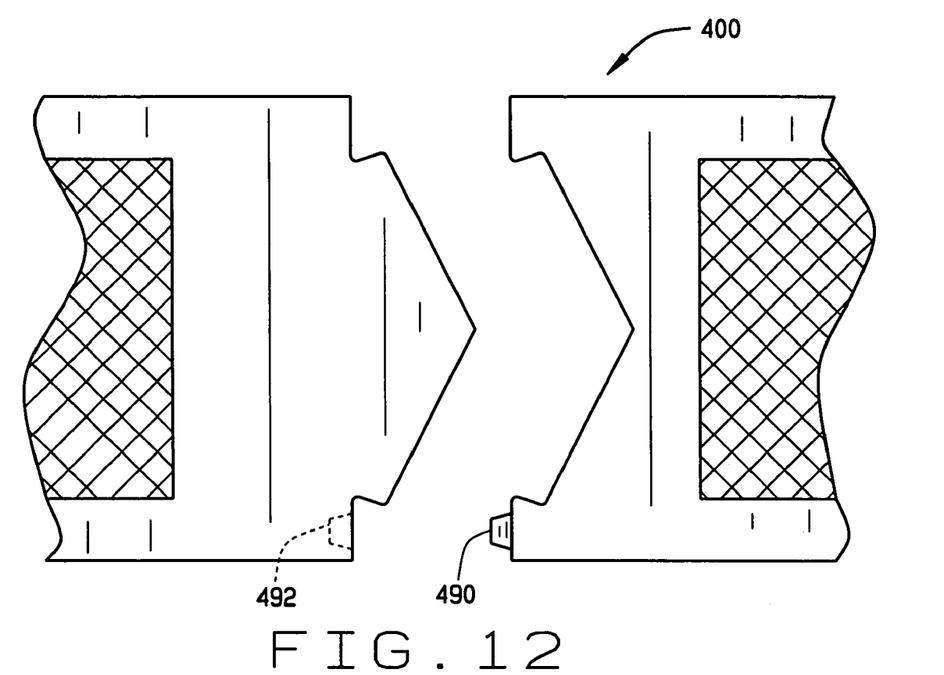
FIG. 12 is a partial view of a filter ring including one key and a corresponding keyway for inhibiting disengagement of a snap latch mechanism when the snap latch mechanism is detachably engaging the filter ring's end portions according to one exemplary embodiment of the invention.
Figure 14:
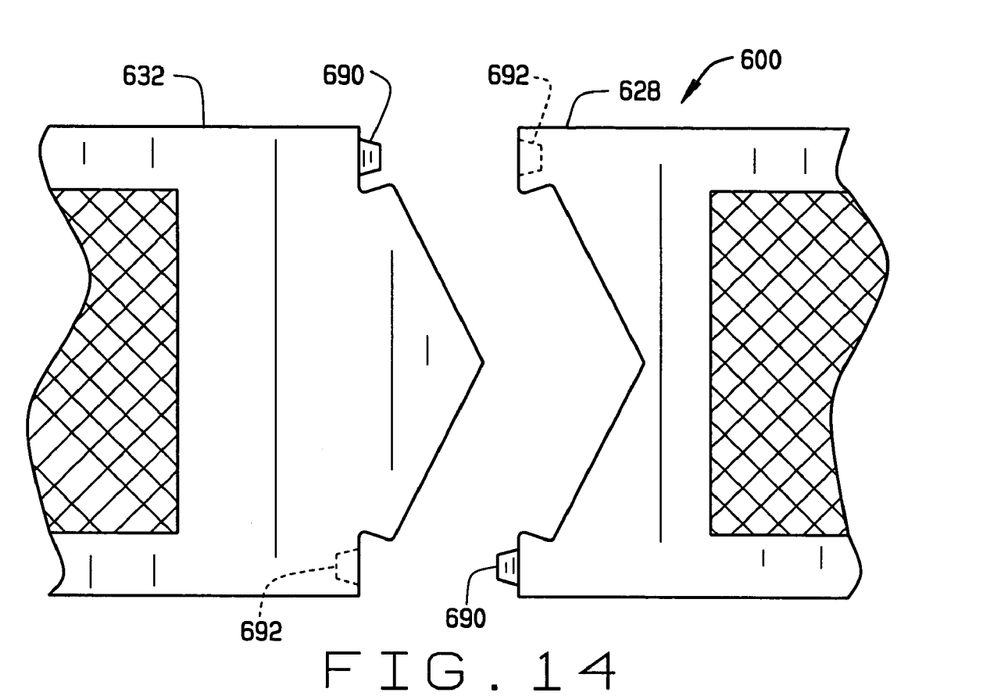
FIG. 14 is a partial view of a filter ring including two keys and corresponding keyways for inhibiting disengagement of a snap latch mechanism when the snap latch mechanism is detachably engaging the filter ring's end portions according to one exemplary embodiment of the invention.
Figure 15:
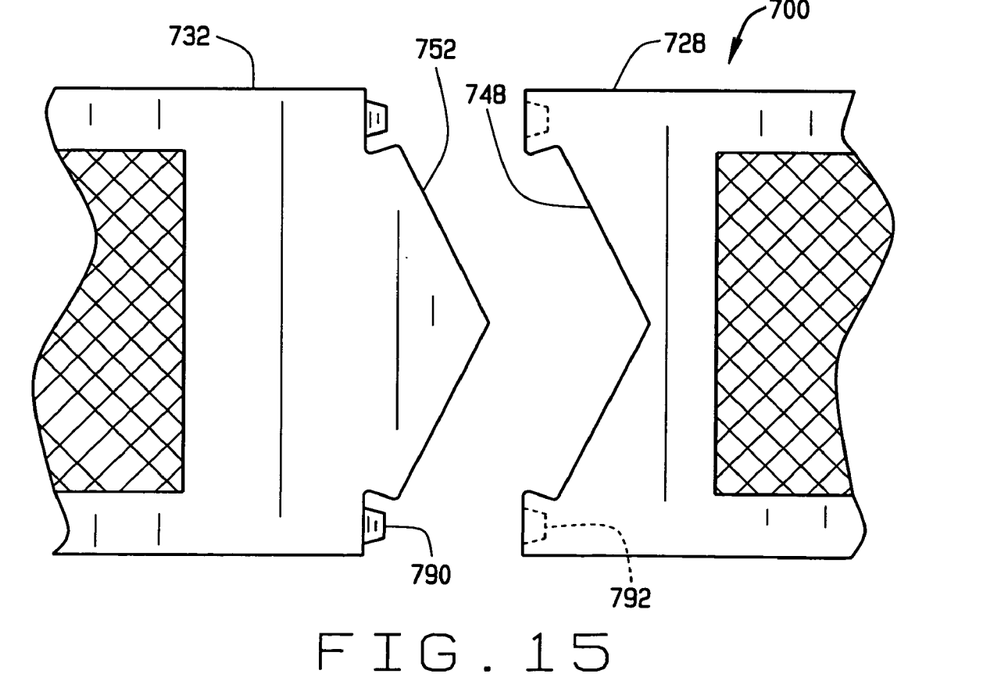
FIG. 15 is a partial view of a filter ring including a key and a corresponding keyway for inhibiting disengagement of a snap latch mechanism when the snap latch mechanism is detachably engaging the filter ring's end portions according to one exemplary embodiment of the invention.

Alternative embodiments, however, can include differently arranged keys and keyways. For example, FIG. 12 illustrates a filter ring 400 that includes only one key 490 and one keyway 492. FIG. 14 illustrates a filter ring 600 having first and second end portions 628 and 632 each of which includes both a key 690 and a keyway 692. FIG. 15 illustrates a filter ring 700 having first and second end portions 728 and 732. But the first end portion 728 includes the keyways 792, while the second end portion 732 includes the keys 790. Accordingly, the first interlocking member 748 is between the keyways 792, and the second interlocking member 752 is between the keys 790.

Referring back to FIGS. 5 through 8, the keys 190 each have an axial length less than the axial length 172 of the first end portion 128. The keyways 192 each have an axial length less than the axial length 180 of the second end portion 132. Accordingly, the keys 190 and keyways 192 do not extend beyond the circumferential edge portions 186, 188 of the filter ring 100.

Further, each key 190 has a radial thickness less than the radial thickness 176 of the first end portion 128. Each keyway 192 has a radial thickness less than the radial thickness 184 of the second end portion 132. Accordingly, the keys 190 and keyways 192 are disposed between inner and outer diameters of the generally annular shape defined by the first and second filter members 104, 108 when the snap latch mechanism 124 is detachably engaging the first end portion 128 with the second end portion 132, as shown in FIG. 3.

As shown in FIG. 7, each key 190 includes a substantially rectangular transverse cross section. Accordingly, the surface 197 at the end of each key 190 is substantially rectangular. Each key 190 also has a substantially trapezoidal longitudinal profile. In the illustrated embodiment, the four lateral surfaces 198 of each key 190 are substantially trapezoidal. Each key 190 tapers as it extends outwardly from the first end portion 128. This tapering of the keys 190 facilitates the engagement of the keys 190 within the keyways 192.

Figure 10:
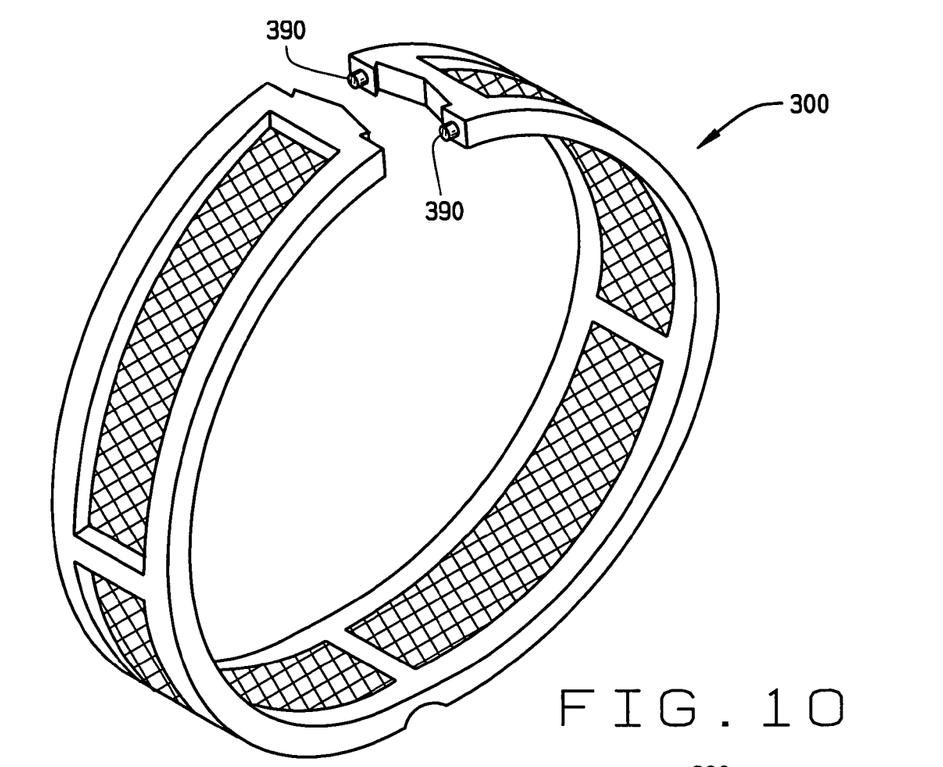
FIG. 10 is a perspective view of a filter ring including two keys and corresponding keyways for inhibiting disengagement of a snap latch mechanism when the snap latch mechanism is detachably engaging the filter ring's end portions according to one exemplary embodiment of the invention.
Figure 11:
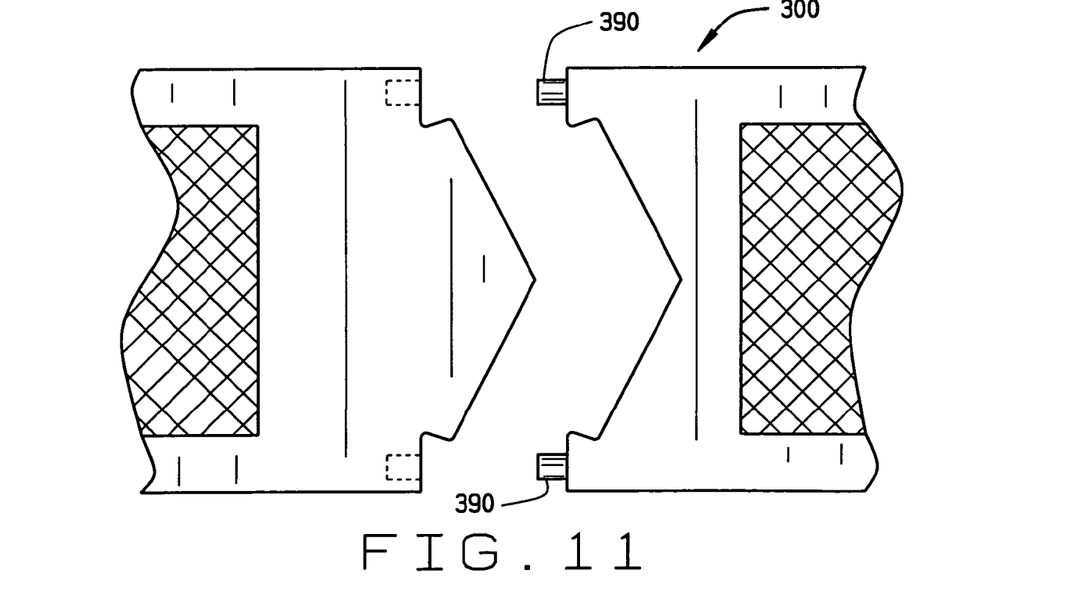
FIG. 11 is a partial view of the filter ring shown in FIG. 10 and illustrating the snap latch mechanism disengaged and the keys aligned for engagement with the keyways.

Alternatively, the keys can include other transverse cross-sectional shapes and longitudinal profiles, such as circular, triangular, ovular, diamond-shaped, polygonal, trapezoidal, combinations thereof, among others. For example, FIGS. 10 and 11 illustrate a filter ring 300 that includes keys 390 which are configured as right circular cylinders.

Figure 13:
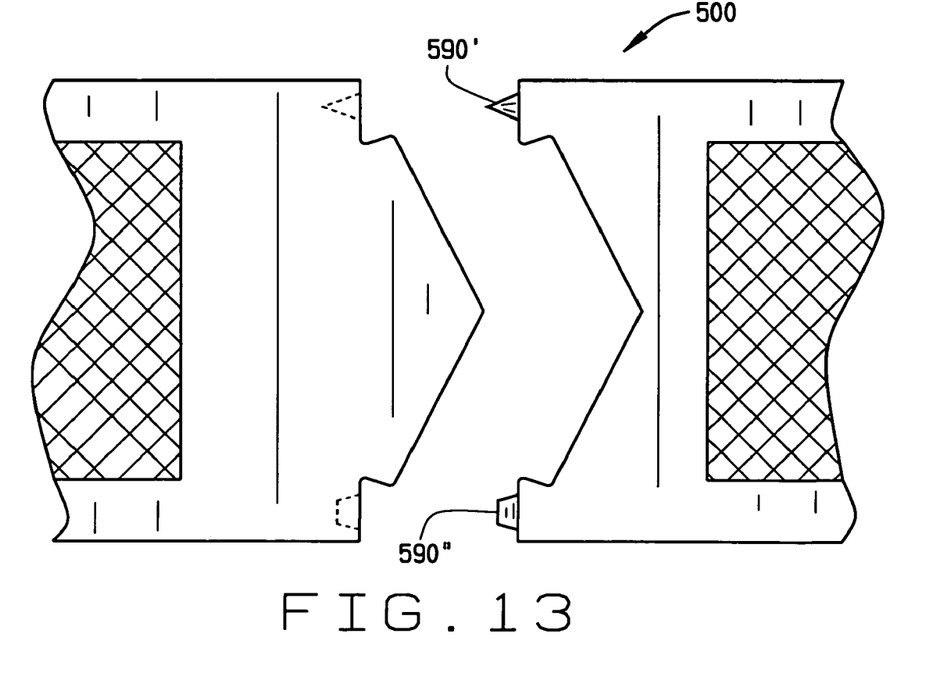
FIG. 13 is a partial view of a filter ring including two differently shaped keys and corresponding keyways for inhibiting disengagement of a snap latch mechanism when the snap latch mechanism is detachably engaging the filter ring's end portions according to one exemplary embodiment of the invention.

In addition, each key does not need to include the same transverse cross-sectional shape. For example, FIG. 13 illustrates a filter ring 500 that includes a first key 590' configured as a right circular cone. The filter ring 500 also includes a second key 590", but the second key 590" has a substantially rectangular transverse cross section and a trapezoidal longitudinal profile. In yet other embodiments, the keys are configured as truncated right circular cones or pyramids. In further embodiments, the keys are configured as domes having substantially circular transverse cross-sections.

In some embodiments, the keys are integrally or monolithically formed with the filter members as a single component. One exemplary implementation utilizes insert injection molding to form the first and second filter members 104, 108 and keys 190 as a single component. In such an exemplary implementation, the filter screens 140 are positioned within a mold cavity, and then molding material (e.g., plastic) is injected into the mold cavity. The molding material is allowed to substantially solidify generally around the filter screens. By insert injection molding the filter ring as a single component, production time and costs can be reduced as compared to processes in which welding is used to secure the filter screens to the filter ring. Alternatively, other suitable manufacturing and molding processes besides insert injection molding can also be used to form the various components of the filter ring.

The keys can also be discrete components that are separately engaged to the filter ring, for example, by press fitting, threads, adhesives, among other suitable methods.

A wide range of materials can be used for the various components of the filter ring 100. For example, the filter members 104 and 108, snap latch mechanism 124, and keys 190 can be formed from a plastic material that is resiliently flexible and fuel tolerant (e.g., chemically non-reactive to fuel). In one particular embodiment, the filter members 104 and 108, snap latch mechanism 124 and keys 190 are formed from 33% glass filled nylon 6/6. Alternatively, other suitable materials can also be used, and the same material does not need to be used for each of the various components of the filter ring (e.g., filter members, snap latch mechanism, and keys).

A description will now be provided of an exemplary manner in which the filter ring 100 may be used. After the filter ring 100 has been manufactured, the filter ring 100 can be closed by engaging the interlocking members 148 and 152 as shown in FIGS. 1, 3, and 5. The closed filter ring 100 can then be shipped to a customer.

During shipping, the filter ring 100 may be jostled and experience vibration. With many existing filter rings, however, this jostling can cause the snap latch mechanism to unsnap and the filter ring to open, which can create problems for the customer. For example, these open filter rings can tangle up with other filter rings. In which case, the tangled filter rings may stop feeding through the feeder tracks of an automated installation system that opens, installs, and closes the filter rings. While a manual procedure can be employed to inspect and close the open filter rings before adding them to the feeder bowls, such a process adds time and tends to slow down the installation process. In various embodiments of the present invention, the engagement of the keys 190 within the keyways 192 advantageously inhibits the disengagement of the snap latch mechanism 124, thereby helping the filter ring 100 remain closed even when pressure is radially applied thereto as often occurs during shipping.

To install the filter ring 100, the snap latch mechanism 124 is opened by disengaging the interlocking members 148 and 152 as shown in FIGS. 2, 4, and 6. With its end portions 128 and 132 disengaged, the filter ring 100 can be positioned around that portion of a fluid conducting body (e.g., cartridge body of a turbocharger, valve body, fuel injector body, etc.) defining the opening(s) through which the fluid will flow. The filter ring 100 is then closed by engaging the interlocking members 148 and 152 as shown in FIGS. 1, 3, and 6. The filter ring 100 is now positioned to filter the fluid as it flows through the filter screens 140. Depending on the direction of the fluid flow, this filtering can occur either before or after the fluid flows through the opening. In those embodiments in which the filter ring 100 is used in a bidirectional flow environment, the engagement of the keys 190 with the keyways 192 advantageously inhibits the disengagement of the snap latch mechanism 124 and helps keep the filter ring 100 closed even when the fluid flows radially outward through the filter screens 140.

The snap latch mechanism 124 also allows the filter ring 100 to be readily removed from and/or reinstalled on a fluid conducting body. For example, if the filter screens 140 become obstructed due to excess accumulation of particulate foreign matter, the filter ring 100 can be opened by disengaging the interlocking members 148 and 152 (as shown in FIGS. 1, 3, and 5). The filter ring 100 can then be removed from the fluid conducting body. After the filter screens 140 have been cleaned (e.g., by using compressed air and/or ultrasonic washing, etc.), the filter ring 100 can be reinstalled and reused. In some situations, however, it might make more sense to simply install a new filter ring 100 rather than cleaning the filter screens 140 and reusing the old filter ring 100.

The teachings of the present invention can be applied in a wide range of fluid conducting bodies and applications in which filter rings are used. Accordingly, the specific references to fuel injectors, valve bodies, and turbochargers should not be construed as limiting the scope of the present invention to any specific form/type of fluid conducting body. Further, the particular methods of manufacture, materials, and geometries disclosed herein are exemplary in nature and are not to be considered limiting.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A filter ring comprising a first filter member including a first end portion, a second filter member including a second end portion, at least one snap latch mechanism for detachably engaging the first end portion with the second end portion such that the first and second filter members cooperate to define a generally annular shape having a central opening, the snap latch mechanism including at least one protrusion projecting outwardly from at least one of the first and second end portions, and at least one complementary shaped cutout extending inwardly into the other of said first and second end portions, the first end portion further including at least one key projecting outwardly from at least one axial face of the first end portion and having a radial thickness less than the filter ring's radial thickness, the second end portion further including at least one keyway extending inwardly into at least one axial face of the second end portion and having a radial thickness less than the filter ring's radial thickness, the at least one key configured to be positioned within the at least one keyway for inhibiting disengagement of the protrusion and cutout of the snap latch mechanism when the snap latch mechanism is detachably engaging the first end portion with the second end portion.

2. The filter ring of claim 1, wherein the at least one key and the at least one keyway are configured to inhibit radial disengagement of the snap latch mechanism when the snap latch mechanism is detachably engaging the first end portion with the second end portion.

3. The filter ring of claim 2, wherein the at least one key and the at least one keyway are configured to increase by at least about 0.8 pounds the average radial force needed to radially disengage the snap latch mechanism when the snap latch mechanism is detachably engaging the first end portion with the second end portion.

4. The filter ring of claim 2, wherein the at least one key and the at least one keyway are configured to at least about double the average radial force needed to radially disengage the snap latch mechanism when the snap latch mechanism is detachably engaging the first end portion with the second end portion.

5. The filter ring of claim 2, wherein the average radial force needed to radially disengage the snap latch mechanism when the snap latch mechanism is detachably engaging the first end portion with the second end portion is at least about 1.2 pounds.

6. The filter ring of claim 1, wherein the at least one key and the at least one keyway are disposed between inner and outer diameters of the generally annular shape defined by the first and second filter members when the snap latch mechanism is detachably engaging the first end portion with the second end portion.

7. The filter ring of claim 1, wherein the at least one key has a substantially rectangular transverse cross section.

8. The filter ring of claim 1, wherein the at least one key has a substantially trapezoidal longitudinal profile.

9. The filter ring of claim 1, wherein the at least one key has a tapered end portion for facilitating engagement with the at least one keyway.

10. The filter ring of claim 1, wherein the first filter member is hingedly coupled to the second filter member.

11. The filter ring of claim 10, wherein the filter ring integrally defines a living hinge hingedly coupling the first filter member to the second filter member.

12. The filter ring of claim 1, wherein the filter ring is produced according to a method comprising positioning at least one filter screen within a mold cavity, and injecting molding material into the mold cavity having the at least one filter screen therein.

13. The filter ring of claim 1, wherein the engagement of the at least one key within the at least one keyway inhibits radial disengagement of the snap latch mechanism independent of the structural features of the snap latch mechanism.

14. A filter ring comprising a first filter member including a first end portion, a second filter member including a second end portion, at least one snap latch mechanism for detachably engaging the first end portion with the second end portion such that the first and second filter members cooperate to define a generally annular shape having a central opening, the first end portion including at least one key projecting outwardly from at least one axial face of the first end portion and having a radial thickness less than the filter ring's radial thickness, the second end portion defining at least one keyway extending inwardly into at least one axial face of the second end portion and having a radial thickness less than the filter ring's radial thickness, the at least one key configured to be positioned within the at least one keyway for inhibiting disengagement of the snap latch mechanism when the snap latch mechanism is detachably engaging the first end portion with the second end portion, wherein the at least one key has an axial length less than an axial length of the first end portion and a radial thickness less than a radial thickness of the first end portion, and wherein the at least one keyway has an axial length less than an axial length of the second end portion and a radial thickness less than a radial thickness of the second end portion.

15. A filter ring comprising a first filter member including a first end portion, a second filter member including a second end portion, at least one snap latch mechanism for detachably engaging the first end portion with the second end portion such that the first and second filter members cooperate to define a generally annular shape having a central opening, the first end portion including at least one key projecting outwardly from at least one axial face of the first end portion and having a radial thickness less than the filter ring's radial thickness, the second end portion defining at least one keyway extending inwardly into at least one axial face of the second end portion and having a radial thickness less than the filter ring's radial thickness, the at least one key configured to be positioned within the at least one keyway for inhibiting disengagement of the snap latch mechanism when the snap latch mechanism is detachably engaging the first end portion with the second end portion, wherein the filter ring includes a circumferential edge portion, and wherein the at least one key and the at least one keyway are each disposed between the snap latch mechanism and the circumferential edge portion.

16. A filter ring comprising a first filter member including a first end portion, a second filter member including a second end portion, at least one snap latch mechanism for detachably engaging the first end portion with the second end portion such that the first and second filter members cooperate to define a generally annular shape having a central opening, the first end portion including at least one key projecting outwardly from at least one axial face of the first end portion and having a radial thickness less than the filter ring's radial thickness, the second end portion defining at least one keyway extending inwardly into at least one axial face of the second end portion and having a radial thickness less than the filter ring's radial thickness, the at least one key configured to be positioned within the at least one keyway for inhibiting disengagement of the snap latch mechanism when the snap latch mechanism is detachably engaging the first end portion with the second end portion, wherein the at least one key includes first and second keys, wherein the at least one keyway includes first and second keyways, and wherein the snap latch mechanism includes a first interlocking member defined by the first end portion between the first and second keys, and a second interlocking member defined by the second end portion between the first and second keyways.

17. A filter ring comprising a first filter member including a first end portion, a second filter member including a second end portion, at least one snap latch mechanism for detachably engaging the first end portion with the second end portion such that the first and second filter members cooperate to define a generally annular shape having a central opening, the first end portion including at least one key projecting outwardly from at least one axial face of the first end portion and having a radial thickness less than the filter ring's radial thickness, the second end portion defining at least one keyway extending inwardly into at least one axial face of the second end portion and having a radial thickness less than the filter ring's radial thickness, the at least one key configured to be positioned within the at least one keyway for inhibiting disengagement of the snap latch mechanism when the snap latch mechanism is detachably engaging the first end portion with the second end portion, wherein the snap latch mechanism includes a protrusion having a generally arrowhead shape defined by one of the first and second end portions, and a complementary shaped cutout defined by the other of said first and second end portions.

18. The filter ring of claim 17, wherein the at least one key and keyway are configured such that when engaged with one another at least a portion of the at least one key is within the at least one keyway at a position inwardly beyond a root of the protrusion's generally arrowhead shape.

19. The filter ring of claim 17, wherein at least a portion of the at least one axial face from which the at least one keyway projects is disposed circumferentially above a tapered surface forming a portion of the cutout.

20. A filter ring comprising a first filter member including a first end portion, a second filter member including a second end portion, at least one snap latch mechanism for detachably engaging the first end portion with the second end portion such that the first and second filter members cooperate to define a generally annular shape having a central opening, the first end portion including at least one key projecting outwardly from at least one axial face of the first end portion and having a radial thickness less than the filter ring's radial thickness, the second end portion defining at least one keyway extending inwardly into at least one axial face of the second end portion and having a radial thickness less than the filter ring's radial thickness, the at least one keV configured to be positioned within the at least one keyway for inhibiting disengagement of the snap latch mechanism when the snap latch mechanism is detachably engaging the first end portion with the second end portion, wherein the at least one key comprises at least one pin having a substantially circular transverse cross section, and wherein the keyway includes at least one generally circular cylindrical passage extending inwardly into at least one axial face of the second end portion.

21. A method comprising engaging a first interlocking member defined by a first end portion of a filter ring with a second interlocking member defined by a second end portion of the filter ring, and positioning at least one key projecting outwardly from and having a base entirely surrounded on all sides by at least one axial face defined by the first end portion within at least one keyway having an opening entirely surrounded on all sides by and extending inwardly into at least one axial face defined by the second end portion to thereby inhibit disengagement of the first and second interlocking members, whereby positioning the at least one key within the at least one keyway positions the axial faces defined by the first and second end portions substantially in contact with one another.

22. The method of claim 21, wherein positioning the at least one key within the at least one keyway inhibits radial disengagement of the first and second interlocking members.

23. The method of claim 21, further comprising positioning the filter ring to filter a fluid flow, and wherein positioning the at least one key within the at least one keyway inhibits disengagement of the first and second interlocking members while said fluid is flowing radially outwardly through said filter ring.

24. The method of claim 21, further comprising shipping the filter ring after engaging the first and second interlocking members and after positioning the at least one key within the at least one keyway, and wherein positioning the at least one key within the at least one keyway inhibits disengagement of the first and second interlocking members during said shipping.

25. The method of claim 21, further comprising making the filter ring by positioning at least one filter screen within a mold cavity, and injecting molding material into the mold cavity having the at least one filter screen therein.

26. A method for inhibiting disengagement of a snap latch mechanism detachably engaging first and second end portions of a filter ring, the snap latch mechanism including at least one protrusion projecting outwardly from at least one of the first and second end portions, and at least one complementary shaped cutout extending inwardly into the other of said first and second end portions, the method comprising positioning at least one key projecting outwardly from at least one axial face defined by the first end portion within at least one keyway extending inwardly into at least one axial face defined by the second end portion, the at least one key and keyway each having a radial thickness less than the filter ring's radial thickness.

27. The method of claim 26, further comprising shipping the filter ring after positioning the at least one key within the at least one keyway, and wherein positioning the at least one key within the at least one keyway inhibits disengagement of the snap latch mechanism during said shipping.

28. The method of claim 26, further comprising positioning the filter ring to filter a fluid flow, and wherein positioning the at least one key within the at least one keyway inhibits disengagement of the snap latch mechanism while said fluid is flowing radially outwardly through said filter ring.

29. The method of claim 26, further comprising making the filter ring by positioning at least one filter screen within a mold cavity, and injecting molding material into the mold cavity having the at least one filter screen therein.

30. A filter ring comprising a first filter member including a first end portion, a second filter member including a second end portion, at least one snap latch mechanism for detachably engaging the first end portion with the second end portion such that the first and second filter members cooperate to define a generally annular shape having a central opening, the snap latch mechanism including at least one protrusion having a generally arrowhead shape projecting outwardly from at least one of the first and second end portions, and at least one complementary shaped cutout extending inwardly into the other of said first and second end portions, the first end portion including first and second generally truncated pyramidal-shaped keys, the first and second keys projecting outwardly from faces of the second end portion such that the corresponding protrusion or cutout of the snap latch mechanism is generally between the first and second keys, the second end portion including first and second keyways extending inwardly into faces of the second end portion such that the corresponding protrusion or cutout of the snap latch mechanism is generally between the first and second keyways, the first and second keys respectively configured to be positioned within the first and second keyways.

31. The filter ring of claim 30, wherein each said key includes a base surrounded on all sides by the corresponding face, and wherein each said keyway includes an opening surrounded on all sides by the corresponding face.

32. The filter ring of claim 30, wherein each said key has a radial thickness less than the filter ring's radial thickness, and wherein each said keyway has a radial thickness less than the filter ring's radial thickness.

33. The filter ring of claim 30, wherein the engagement of the keys within the keyways positions at least a portion of each said key within the corresponding keyway at a position inwardly beyond a root of the protrusion's generally arrowhead shape.

34. The filter ring of claim 30, wherein at least a portion of each said face from which either the first or second key projects is disposed circumferentially above a tapered surface forming a portion of the cutout.

35. The filter ring of claim 30, wherein engagement of the key within the keyway positions the faces of the first and second end portions substantially in contact with one another.

36. A filter ring comprising a first filter member including a first end portion, a second filter member including a second end portion, an interlock for detachably engaging the first end portion with the second end portion such that the first and second filter members cooperate to define a generally annular shape having a central opening, at least one key projecting outwardly from and having a base entirely surrounded on all sides by at least one axial face defined by the first end portion, at least one keyway having an opening entirely surrounded on all sides by and extending inwardly into at least one axial face defined by the second end portion, the at least one key configured to be positioned within the at least one keyway for inhibiting disengagement of the snap latch mechanism when the snap latch mechanism is detachably engaging the first end portion with the second end portion.

37. The filter ring of claim 36, wherein the at least one key and keyway are configured such that when engaged with one another the axial faces defined by the first and second end portions are substantially in contact with one another.

38. A method for inhibiting disengagement of a snap latch mechanism detachably engaging first and second end portions of a filter ring, the method comprising positioning at least one key projecting outwardly from at least one axial face defined by the first end portion within at least one keyway extending inwardly into at least one axial face defined by the second end portion, the at least one key and keyway each having a radial thickness less than the filter ring's radial thickness,     wherein the snap latch mechanism includes at least one protrusion having a generally arrowhead shape projecting outwardly from at least one of the first and second end portions, and at least one complementary shaped cutout extending inwardly into the other of said first and second end portions, and wherein positioning the at least one key within the at least one keyways includes positioning at least a portion of the at least one key at a position inwardly beyond a root of the protrusion's generally arrowhead shape.

* * * * *

UNITED STATES PATENT AND TRADEMARK OFFICE
CERTIFICATE OF CORRECTION

| | | |
|---|---|---|
| PATENT NO. | : 7,041,217 B1 | Page 1 of 1 |
| APPLICATION NO. | : 11/017018 | |
| DATED | : May 9, 2006 | |
| INVENTOR(S) | : Jeffrey A. Close et al. | |

It is certified that error appears in the above-identified patent and that said Letters Patent is hereby corrected as shown below:

<u>Claim 20</u>

Column 10, line 44: change "keV" to "key".

Signed and Sealed this

Fifteenth Day of August, 2006

JON W. DUDAS
*Director of the United States Patent and Trademark Office*